United States Patent
Nakano et al.

[11] Patent Number: 5,424,880
[45] Date of Patent: Jun. 13, 1995

[54] INFORMATION SIGNAL RECORDING AND REPRODUCING APPARATUS CAPABLE OF AUTOMATICALLY ADJUSTING PHASE VARIATIONS

[75] Inventors: Hiroshi Nakano; Masakazu Ohashi, both of Kanagawa, Japan

[73] Assignee: Sony Corporation, Tokyo, Japan

[21] Appl. No.: 44,468

[22] Filed: Apr. 9, 1993

[30] Foreign Application Priority Data

Apr. 14, 1992 [JP] Japan .................... 4-120007

[51] Int. Cl.⁶ .................. G11B 20/20; G11B 5/02
[52] U.S. Cl. ............................. 360/26; 360/27
[58] Field of Search .............. 360/26, 27, 64, 15, 360/31

[56] References Cited

U.S. PATENT DOCUMENTS

| | | | |
|---|---|---|---|
| 4,141,045 | 2/1979 | Sheehan | 360/15 |
| 4,312,019 | 1/1982 | Kimura | 360/26 X |
| 4,376,268 | 3/1983 | Moriya et al. | 360/33.1 X |
| 4,504,870 | 3/1985 | Kitamura et al. | 360/31 X |
| 5,146,448 | 9/1992 | Adachi et al. | 360/15 |

Primary Examiner—Aristotelis Psitos
Assistant Examiner—Jennifer Pearson Wright
Attorney, Agent, or Firm—William S. Frommer; Alvin Sinderbrand

[57] ABSTRACT

An information signal recording and reproducing apparatus having a reproducing head at a position anterior to a recording head by a distance corresponding to a predetermined time interval for recording an information signal on a recording medium and reproducing the recorded information signal. A test pattern signal is generated and delayed in a delay circuit by an amount determined by a control signal. An external delay-factor device receives the delayed test pattern signal and imposes a further delay thereon. The phase of the delayed signal from the external delay-factor device and the phase of the test pattern signal are compared and the control signal is generated, such that the sum of the amounts of delay imposed by the external device and the delay circuit becomes coincident with the predetermined time interval. Thus, the desired phase adjustment can be automatically and rapidly achieved with precision.

8 Claims, 3 Drawing Sheets

INFORMATION SIGNAL RECORDING AND REPRODUCING APPARATUS CAPABLE OF AUTOMATICALLY ADJUSTING PHASE VARIATIONS

BACKGROUND OF THE INVENTION

1. Field of the Invention

The present invention relates to an audio signal recording/reproducing apparatus and, more particularly, to an apparatus capable of automatically adjusting a variation caused in the signal phase due to any signal process executed by an external digital device in a digital audio system.

2. Description of the Related Art

In an audio signal recording/reproducing apparatus which records an audio signal on a recording medium and reproduces the same signal from the recording medium, there may occur an undesired phenomenon that, when overwriting or the like is executed on the recorded audio signal by an external digital device during an editing operation based on a reference time code, the phase of the recorded audio signal is delayed in comparison with the reference time code.

Such phase delay is dependent on the amount of the delay derived from the process executed by the external digital device. And in case a plurality of external digital devices are connected, it follows that the delays in the individual devices are accumulated.

For the purpose of compensating such phase delay, it has been generally customary in the prior art that the audio signal recording/reproducing apparatus is equipped with an advance reproducing function for outputting the reproduced signal with a sufficient margin lead of the phase with respect to the reference time code, and also a delay adjusting function for delaying the advanced output to thereby attain a coincidence with the phase of the reference time code.

If a user checks the delay in each device by utilizing such delay adjusting function and manually adjusts the phase in conformity with the result of such check, it becomes possible to edit, record and reproduce the audio signal at any given position indicated on the recording medium by the reference time code while disregarding harmful influence that may be caused by the delay in the external digital device.

In such phase adjustment, however, the amount of the signal delay in each external digital device needs to be detected prior to the adjustment which consequently complicates the operation. And in case a plurality of external devices are connected, calculation of the accumulated delays is necessary, and the procedure thereof also renders the adjustment intricate to eventually induce errors.

OBJECT AND SUMMARY OF THE INVENTION

It is an object of the present invention to provide an information signal recording/reproducing apparatus equipped with an audio signal phase adjuster which is capable of automatically adjusting the phase delay with rapidity and high precision.

According to one aspect of the present invention, there is provided an apparatus having a reproducing head at a position anterior to a recording head by a distance corresponding to a predetermined time interval and recording an information signal on and/or reproducing the same from a recording medium together with address signals indicative of absolute addresses on the recording medium. The apparatus comprises a means for generating a test pattern signal; a delay means for delaying the test pattern signal by a predetermined amount in conformity with a control signal; an output means for delivering the output of the delay means to an external delay-factor device; an input means for receiving the signal of the output means via the external delay-factor device; a means for comparing the phase of the signal from the input means with the phase of the output signal from the test pattern signal generating means; and a control means for generating the control signal on the basis of the output of the phase comparing means. In this apparatus, the phase is adjusted by the control signal generated in such a manner that the sum of the respective delay values of the external device and the delay means becomes coincident with the aforesaid predetermined time interval.

According to another aspect of the invention, there is provided a digital information signal recording/reproducing apparatus wherein the component means constituting the apparatus are digitized.

In the apparatus of the invention, the information signal is an audio signal, and the output of the test pattern signal generating means is a sawtoothwave signal.

The above and other features and advantages of the present invention will become apparent from the following description which will be given with reference to the illustrative accompanying drawings.

DESCRIPTION OF THE PREFERRED EMBODIMENTS

Hereinafter exemplary embodiments of the audio signal recording/reproducing apparatus according to the present invention will be described in detail with reference to the accompanying drawings.

Figure 1:
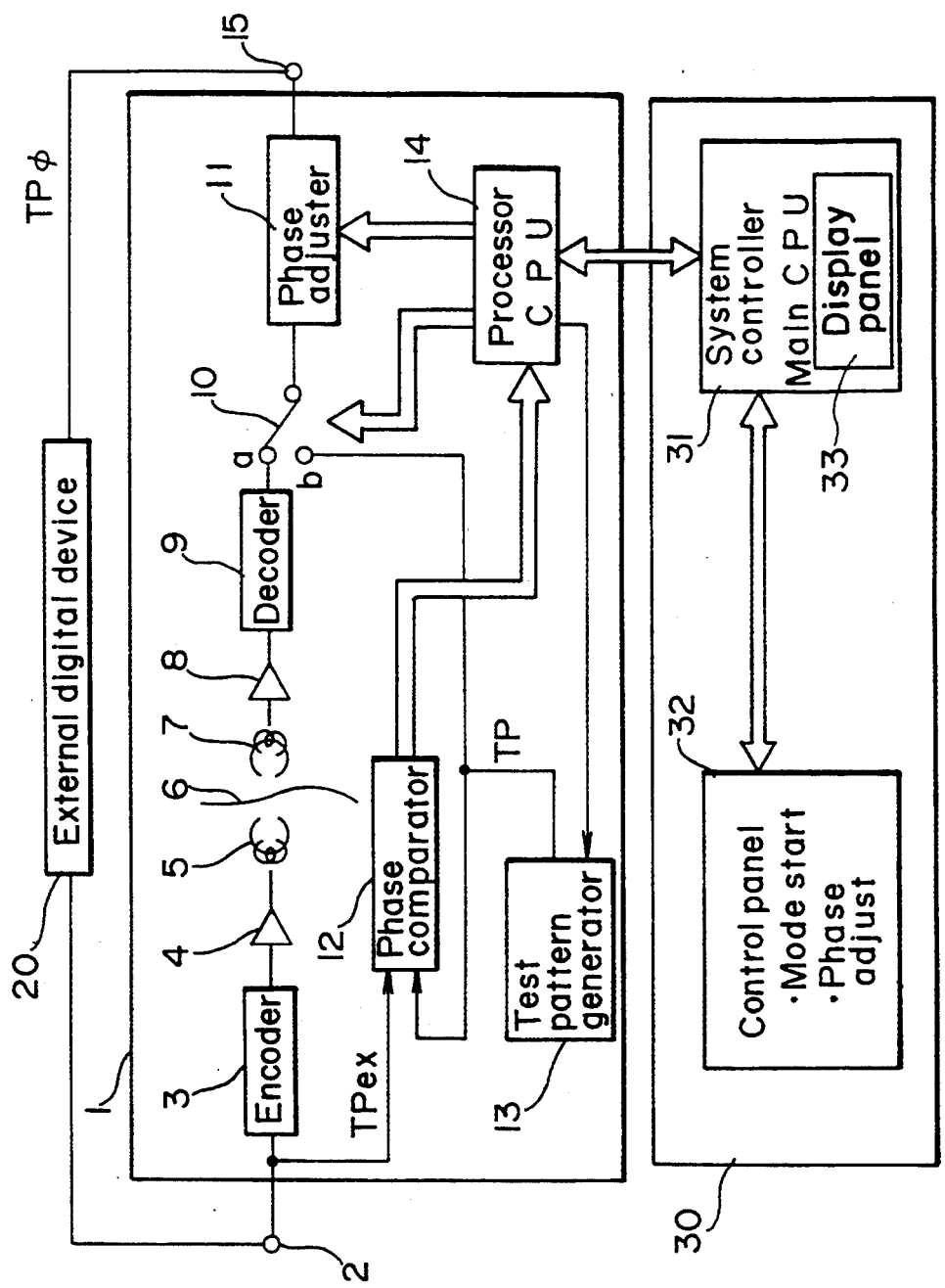
FIG. 1 is a block diagram of a first embodiment representing the apparatus of the present invention.

FIG. 1 is a block diagram of a primary embodiment representing the apparatus of the invention.

The audio signal recording/reproducing apparatus 1 performs its operation of recording an audio signal on a recording medium such as a magnetic tape 6 and reproducing the recorded audio signal from the tape 6. The apparatus 1 has a digital input terminal 2 and a digital output terminal 15, wherein a cyclic process is executed in such a manner that the signal delivered from the output terminal 15 is supplied to an external digital device 20, whose output signal is then supplied to the input terminal 2, and the phase of the output audio signal is adjusted in accordance with the phase delay of the signal obtained by the cyclic process.

In describing this embodiment, an explanation will be given below with regard to a digital audio tape recorder (ATR) taken as an example of the audio signal recording/reproducing apparatus. In the block diagram of FIG. 1, a reproducing circuit of the apparatus 1 principally comprises a reproducing head 7, a reproducing amplifier 8, a decoder 9, and a phase adjuster 11. Meanwhile a recording circuit principally comprises an encoder 3, a recording amplifier 4, and a recording head 5.

In this embodiment, the output terminal 15 is further connected to an external digital device (e.g., an effector) 20, and the output of such external digital device 20 is connected to the aforementioned input terminal 2 to thereby form a loop. Thus, a dubbing circuit in an editing mode is falsely formed by feeding back the audio signal from the output terminal 15 to the input terminal 2.

In the audio signal recording/reproducing apparatus 1, the phase delay relative to the digital audio circuit of the digital ATR is adjusted (e.g., by the aforementioned cyclic process). In this embodiment, the external digital device 20 for processing the signal from the digital ATR corresponds to a source of generation of the phase delay to be adjusted.

According to this embodiment, adjustment of the phase delay caused in the audio system (derived from the external digital device 20) is executed by the digital audio circuit. For this purpose, the audio signal recording/reproducing apparatus 1 in this embodiment comprises a test pattern signal generator 13 for generating a test pattern signal adapted for phase adjustment, a phase comparator 12 for detecting the phase variation of the test signal caused due to the signal process in the external digital device 20, a processor 14 for outputting a phase adjustment value corresponding to the phase variation detected by the phase comparator 12, and a phase adjuster 11 for adjusting the phase of the audio signal on the basis of the phase adjustment value outputted from the processor 14.

A control block 30 shown in FIG. 1 is provided for control of the cyclic process in the audio signal recording/reproducing apparatus 1 and is used for starting a test mode to execute the cyclic process and the adjustment, or for designating a desired delay time of the output audio signal. The operation for starting the cyclic process mode or selecting the delay time is performed by manipulating a control panel 32 included in the block 30.

The output of the control panel 32 is supplied to a main CPU 31 which serves as a system controller. In the main CPU 31, control data outputted from the control panel 32 is converted into data adapted to be identified by the processor 14.

Thus, the test mode for the phase adjustment is started by manipulation of the control panel 32. The test-mode start control data and the phase delay value outputted from the control panel 32 are supplied via the main CPU 31 to the processor 14.

Figure 2:
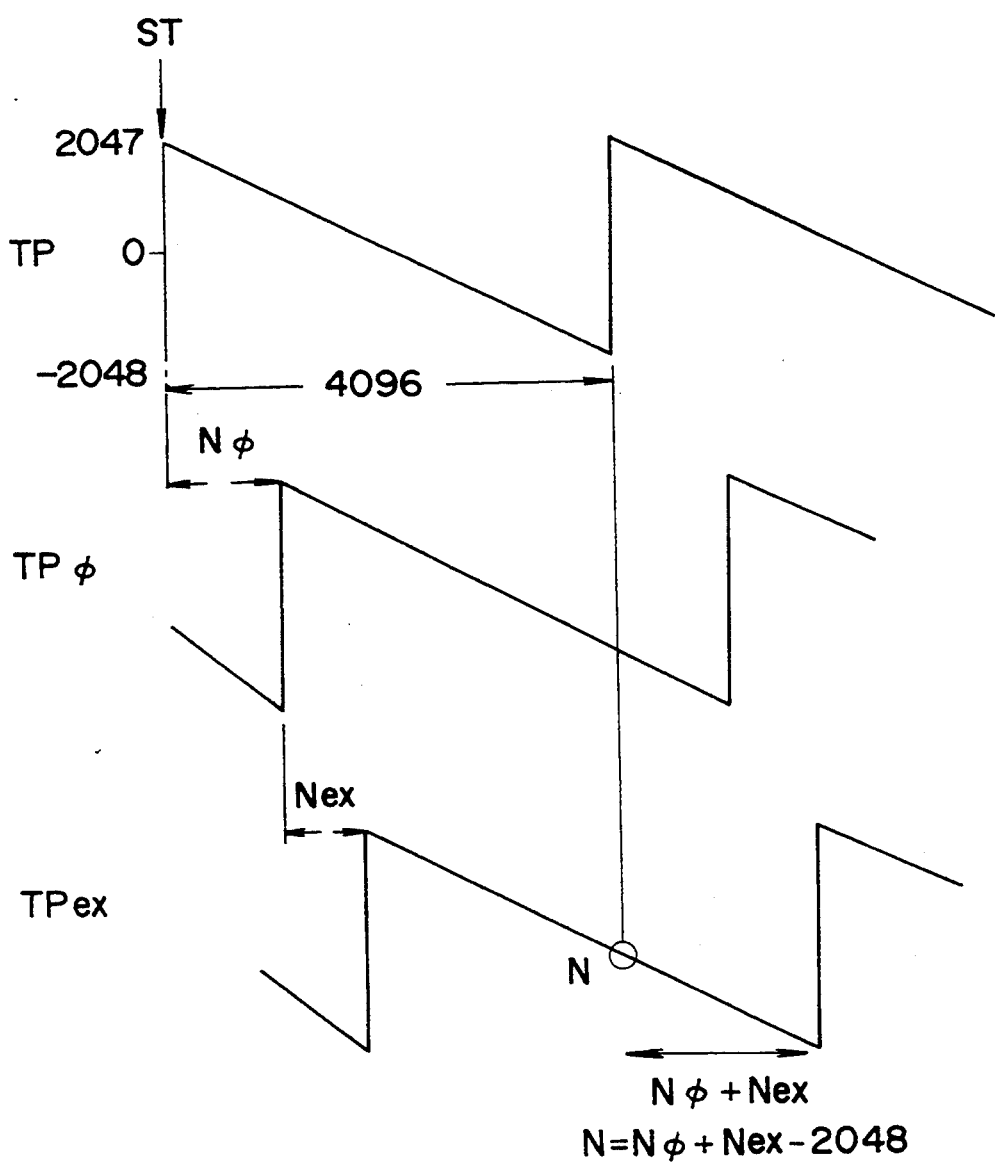
FIG. 2 is a waveform chart of signals for explaining the operation of the first embodiment.

A control signal is supplied from the processor 14 to the test pattern signal generator 13 so as to generate a test pattern signal TP adequate for adjustment of the phase, as shown in FIG. 2. And simultaneously the processor 14 starts the test mode in response to a test-mode start command (start timing ST in FIG. 2) received from the main CPU 31.

The test pattern signal TP outputted from the signal generator 13 and adequate for the phase adjustment selected by the control panel 32 is fed to a terminal b of a switch 10 which is changed by a switching signal outputted from the processor 14 on the basis of the input received from the control panel 32. The terminal b is selected in response to supply of the test pattern signal TP.

Upon start of the test mode, a sawtooth test pattern signal is outputted from the signal generator 13 and then is passed through a cyclic route formed of the output terminal 15 of the phase adjuster 11, the external digital device 20 and the input terminal 2. Subsequently, the phase deviation from the original signal is detected in the phase comparator 12, and a phase adjustment value corresponding to such phase deviation is calculated in the processor 14.

More specifically, the phase adjustment value can be obtained by the method shown in the signal wave form chart of FIG. 2. In this chart, TP denotes a test pattern signal outputted from the test pattern signal generator 13. The test pattern signal is composed of sawtooth waves whose period corresponds to 4096 words, and its value changes linearly from 2047 (7ff hex) to (800 hex). It is supplied as an original signal to the phase comparator 12.

Further in FIG. 2, $Tp_\phi$ denotes a signal delayed by $N_\phi$ words in the phase adjuster 11, and TPex denotes a signal delayed by Nex words in the external digital device 20. Such signals are supplied via the input terminal 2 to the phase comparator 12.

Subsequently, as shown in FIG. 2, the delay value Nex caused in the external digital device 20 is calculated from the delay value N of the signal TPex at the timing of 2047 of the test pattern signal TP and also from the delay value $N_\phi$ of the phase adjuster 11. Namely, $Nex = N - N_\phi + 2048$.

In the processor 14, a phase adjustment value ($N_\phi$ − Nex) for compensating the delay value Nex of the external digital device 20 is calculated from the output value N of the phase comparator 12 and the delay value $N_\phi$ of the phase adjuster 11, and the calculated value is fed to the phase adjuster 11. The delay value $N_\phi$ of the phase adjuster 11 needs to be set with a sufficient margin for compensating the delay value Nex of the external digital device 20.

Now the delay value $N_\phi$ of the phase adjuster 11 will be described below.

In the operation of FIG. 1 where the signal reproduced from the tape 6 is processed via the reproducing-stage decoder 9, the external digital device 20 and the recording-stage encoder 3 and then is recorded again on the tape 6, the reproducing head 7 is disposed at a position anterior to the recording head 5 by a distance corresponding to the value for sufficiently compensating the total delay in the cyclic route, so that the reproduced signal can be recorded again at the same position as that of the original signal on the tape 6.

In the recording/reproducing apparatus 1 where the reproducing head 7 is so disposed as mentioned, the delay value $N_\phi$ of the phase adjuster 11 is selectively determined in such a manner that the sum of the delay values of the reproducing-stage decoder 9, the external digital device 20, the recording-stage encoder 3 and the phase adjuster 11 becomes equal to the delay derived from the positional arrangement in which the reproducing head 7 is disposed anterior to the recording head 5, whereby the reproduced audio signal after being passed through the aforementioned cyclic route can be recorded again at the same position as that of the original signal on the tape 6.

In the embodiment mentioned above, the delay value Nex of the external digital device 20 calculated by the processor 14 is stored in the system controller 31 together with the type of the digital external device, whereby the phase adjustment value designated from the control panel 32 on the basis of the delay value of the external digital device can be supplied directly to the processor 14 without the necessity of executing the aforementioned calculation again.

If necessary, it is also possible to adopt a display means for visually representing the calculated delay value of the external digital device 20 on a display panel 33 provided in the system controller 31.

Figure 3:
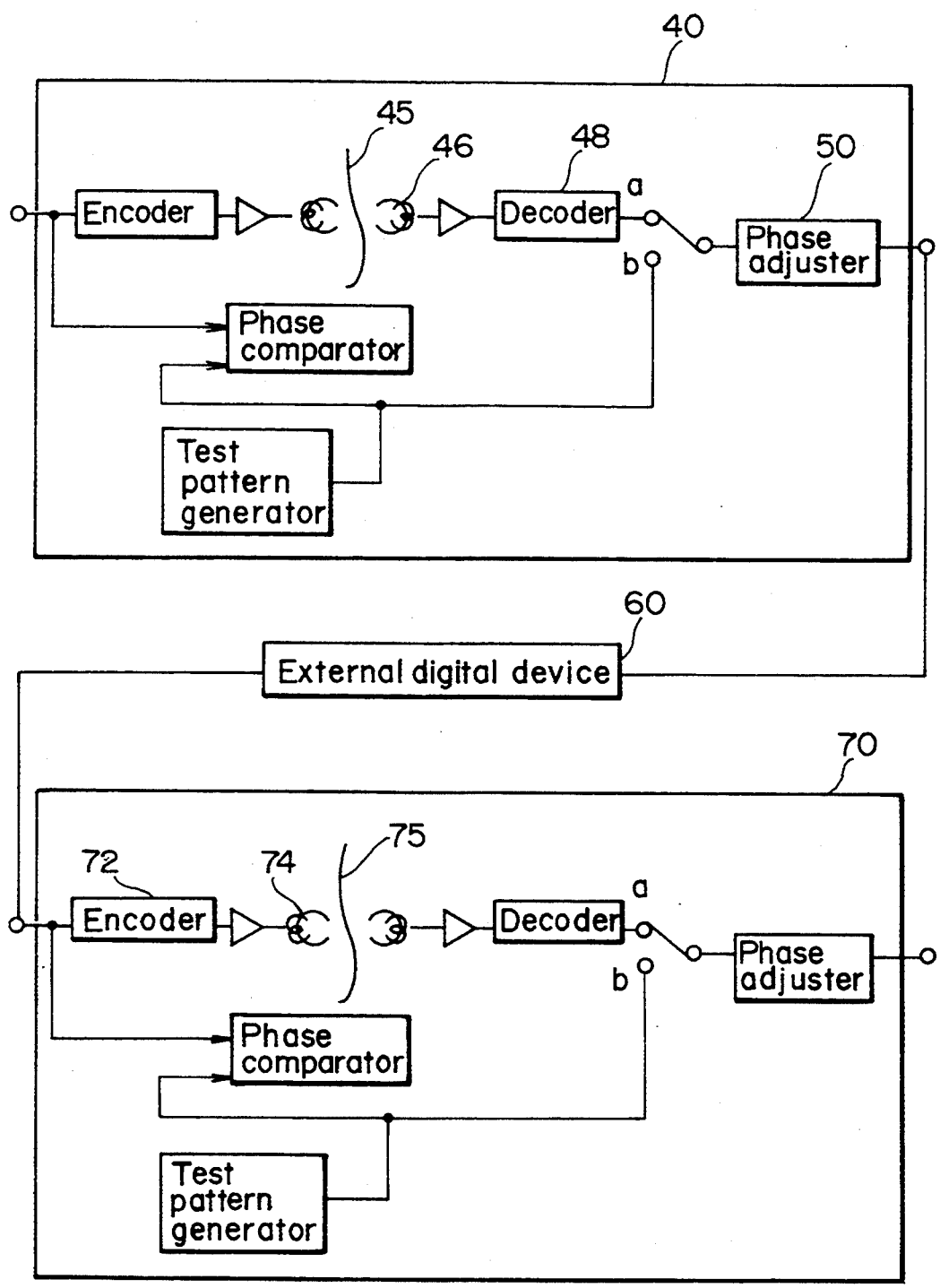
FIG. 3 is a block diagram of a second embodiment representing the apparatus of the present invention.

Hereinafter, a description will be given on a second embodiment of FIG. 3 where a signal reproduced from a tape in a reproducing ATR is recorded again on the tape after being passed via a cyclic route of a reproducing-stage decoder, an external digital device and a recording-stage encoder. In FIG. 3, the fundamental constitution of each of the recording/reproducing apparatus 40 and 70 is similar to that of the afore-mentioned apparatus 1 shown in FIG. 1. Therefore, reference numerals are given merely to the components required for the following explanation, and both a processor and a controller are omitted in the diagram.

In the recording/reproducing apparatus 40 of FIG. 3 where a reproducing head 46 is disposed anterior to a reference time code, the delay value of a phase adjuster 50 in the recording/reproducing apparatus 40 is so determined that the sum of the respective delay values of a reproducing-stage decoder 48, an external digital device 60, a recording-stage encoder 72 in the recording-/reproducing apparatus 70 and the phase adjuster 50 becomes equal to the delay value derived from the arrangement where the reproducing head 46 is disposed anterior to the recording head 74 on the reference time code, so that the reproduced audio signal is recorded again on the tape 75 exactly at the same position after being passed via the cyclic processing route.

Consequently, in the recording and reproducing operations of the reproducer 40 and the recorder 70 performed in phase-synchronism with the reference time code, the reproduced signal can be recorded again on the recording tape 75 exactly at the position coincident with the corresponding time code address on the playback tape 45 due to the arrangement where the reproducing head 46 is disposed anterior to the recording head 74 on the time code with a sufficient margin for compensating the total delay of the relevant processing route.

In the audio signal recording/reproducing apparatus shown in FIGS. 1 and 3, the reproducing heads 7 and 46 are disposed anterior to the recording heads 5 and 74 respectively with a sufficient margin for compensating the delay of the external digital devices 20 and 60.

Suppose now that none of external digital devices is connected, and the delay value of the phase adjuster 11 or 50 is N'. Then the phase of the recording signal leads by an amount of Nex words corresponding to the delay value of the external device. For compensating such phase lead, the phase adjuster 11 or 50 functions to delay the signal by an amount of Nex words corresponding to the external digital device, so that there is obtained a phase delay value $N_\phi = N' + Nex$ in the recording/reproducing mode when no external digital device is connected.

Since the value $N_\phi$ is determined by the method mentioned above, it is normally possible to compensate the delay of any external digital device with a sufficient gain. Consequently, in the test mode, an audio signal having a leading phase to compensate the delay of the external digital device is outputted by feeding to the phase adjuster the phase adjustment value $N' - N_\phi - Nex$ calculated in the processor 14.

In the audio signal recording/reproducing apparatus of the present invention, as mentioned above, a phase adjustment is executed by generating a test pattern signal and compensating the phase delay in accordance with the adjustment value which corresponds to the phase variation caused in the test pattern signal due to the passage thereof through the external delay-factor device, so that the desired adjustment can be achieved automatically to realize operational rapidity and high precision.

What is claimed is:

1. In an information signal recording and reproducing apparatus having a reproducing head at a position anterior to a recording head by a distance corresponding to a predetermined time interval for recording an information signal on a recording medium and reproducing the recorded information signal; the combination of:
   means for generating a test pattern signal;
   delay means for delaying said test pattern signal by an amount determined by a control signal;
   an external delay-factor device receiving the delayed test pattern signal from said delay means and imposing a further delay thereon;
   phase comparing means for comparing a phase of the further delayed test pattern signal from said external delay-factor device with a phase of the test pattern signal from said test pattern signal generating means; and
   control means for generating said control signal in accordance with an output of said phase comparing means, such that a sum of the amounts of delay imposed by said external delay-factor device and said delay means, respectively, becomes coincident with said predetermined time interval.

2. In a digital information signal recording and reproducing apparatus having a reproducing head at a position anterior to a recording head by a distance corresponding to a predetermined time interval for recording an information signal on a recording medium and reproducing the recorded information signal; the combination of:
   means for generating a digital test pattern signal;
   digital delay means for delaying said digital test pattern signal by an amount determined by a digital control signal;
   a digital external delay-factor device receiving the delayed digital test pattern signal from said digital delay means and imposing a further delay thereon;
   phase comparing means for comparing a phase of the further delayed digital test pattern signal from said external digital delay-factor device with a phase of the digital test pattern signal from said digital test pattern signal generating means; and
   digital control means for generating said digital control signal in accordance with an output of said digital phase comparing means, such that a sum of the amounts of delay imposed by said external digital delay-factor device and said digital delay means, respectively, becomes coincident with said predetermined time interval.

3. The apparatus according to claim 1, wherein said information signal is an audio signal.

4. The apparatus according to claim 3, wherein said test pattern signal generating means generates a sawtooth-wave signal.

5. The apparatus according to claim 4, wherein said control means includes a microprocessor.

6. The apparatus according to claim 5, further comprising a system controller for storing the control signal generated from said control means, and storing a signal identifying a type of said external delay-factor device.

7. The apparatus according to claim 6, wherein said system controller has a display panel for displaying the value of said further delay imposed by said external delay-factor device.

8. An information signal recording and reproducing apparatus having a reproducing head at a position anterior to a recording head by a distance corresponding to a predetermined time interval for recording an information signal on a recording medium and reproducing the recorded information signal, said apparatus comprising:

means for selecting a test operation mode or a normal operation mode;

means operative in said test operation mode for generating a test pattern signal;

delay means for delaying said test pattern signal by an amount determined by a control signal;

an external delay-factor device receiving the delayed test pattern signal from said delay means and imposing a further delay thereon;

phase comparing means operative in said test operation mode for comparing a phase of the further delayed test pattern signal from said external delay-factor device with a phase of the test pattern signal from said test pattern signal generating means;

control means operative in said test operation mode for generating said control signal in accordance with an output of said phase comparing means, such that a sum of the amounts of delay imposed by said external delay-factor device and said delay means, respectively, becomes coincident with said predetermined time interval;

means for storing said control signal obtained in said test operation mode;

reproducing means operative in said normal operation mode for reproducing said information signal from said recording medium and supplying the reproduced information signal to said delay means;

means for varying the delay in said delay means for delaying said reproduced information signal in accordance with the stored control signal;

means for supplying the delayed information signal to said external delay-factor device for processing the information signal; and recording means for recording the processed information signal on said magnetic tape, the recorded information signal being delayed an amount equal to said predetermined time interval such that said recorded information signal overwrites the corresponding information signal previously reproduced by said reproducing means.

* * * * *